United States Patent [19]

Liberman

[11] Patent Number: 4,588,859

[45] Date of Patent: May 13, 1986

[54] TWO CHANNEL AUDIO COMMUNICATION SYSTEM

[76] Inventor: Zvie Liberman, c/o Talk-A-Phone Co., 5013 N. Kedzie Ave., Chicago, Ill. 60625

[21] Appl. No.: 519,546

[22] Filed: Aug. 2, 1983

[51] Int. Cl.⁴ .............................................. H04M 9/08
[52] U.S. Cl. ...................... 179/37; 179/81 B
[58] Field of Search .................... 179/37, 170.8, 81 B, 179/100 L; 381/78, 93, 104, 110, 107, 108

[56] References Cited

U.S. PATENT DOCUMENTS

| | | | |
|---|---|---|---|
| 2,213,991 | 9/1940 | Mitchell | 179/170.8 |
| 2,328,951 | 9/1943 | Bryant | 179/170.8 X |
| 2,743,314 | 4/1956 | Jeanlin | 179/37 |
| 3,291,911 | 12/1966 | McCullough | 179/37 |
| 3,963,876 | 6/1976 | Holtz et al. | 179/81 B |
| 3,970,786 | 7/1976 | Randmere | 179/81 B |
| 4,006,310 | 2/1977 | Bayer | 179/37 |
| 4,049,911 | 9/1977 | Schlaff et al. | 179/37 |
| 4,484,034 | 11/1984 | Ferrieu et al. | 179/81 B |
| 4,506,861 | 3/1985 | Ono | 381/108 X |
| 4,507,524 | 3/1985 | Yun | 179/81 B |

FOREIGN PATENT DOCUMENTS 726253  1/1966  Canada ................................ 381/104

Primary Examiner—Keith E. George
Attorney, Agent, or Firm—Wood, Dalton, Phillips, Mason & Rowe

[57] ABSTRACT

A two channel intercommunication system has a high degree of noise immunity. The gain of each channel is controlled by a gain control loop processing circuit. The signal condition in one channel turns off the other channel. Multiple active rectifier-filter circuits discriminte between speech and noise and provide timing of control signals.

16 Claims, 5 Drawing Figures

TWO CHANNEL AUDIO COMMUNICATION SYSTEM

DESCRIPTION

1. Field of the Invention

This invention relates to a two channel audio communication system with the gain of each channel controlled to enhance audio signal transmission and to discriminate against noise.

2. Background of the Invention

Two channel intercommunication systems with gain control of both channels are known. See, for example, McCullough U.S. Pat. No. 3,291,911. Such systems are used in many activities communication between the two parties where separation by distance or a structure or the like prevents direct communication. Common examples are a bank teller in a drive-up facility or an attendant in a fast food outlet. Typically, the systems have one channel with an inside microphone for the attendant and an outside speaker to which the patron listens, and the second channel with a microphone for the patron and a speaker for the attendant.

In the system of the McCullough patent the gain of both channels is controlled by signal conditions in the channel through which the attendant talks to the patron. Thus, the attendant maintains control of the system operation.

Systems such as that of McCullough, however, are subject to interference and erratic operation as a result of environmental sounds and noise and from irregular speech patterns of the attendant.

SUMMARY OF THE INVENTION

It is a feature of the invention to obviate one or more of the problems of prior communication systems outlined above.

More particularly, the system has two channels with a gain control loop for each channel and an interconnection between the channels such that the conditions of one channel modify the operation of the gain control loop of the other channel.

Another feature is that one or both of the signal channels includes processing of the amplitude and frequency spectrum characteristics of the signals conducted therethrough.

A further feature of the invention is that the gain control loops for one or both channels include signal processing such as signal level control, signal frequency control, one or more active rectifiers with signal attack and decay control.

Yet another feature is that the intercommunication system has two channels each with a signal processing gain control loop and a control circuit for the gain control loops of each channel. The control circuit has an input from one of the channels and includes a plurality of series connected active rectifiers with frequency selection and integrator circuits having charge and discharge times which reject noise and enhance the response of the system to the desired audio signals.

Further features and advantages of the invention will readily be apparent from the following specification and from the drawings.

The intercommunication systems shown herein have two channels and provide for two way communication between parties at locations separated by distance or by a barrier to direct communication. Typical examples are a drive-up teller booth for a bank, the customer attendant or cashier at a fast food operation and the cashier at a self-service gasoline station. In each of these examples both locations, that of the attendant and that of the customer, are generally noisy. However, the nature of the noise differs. The intercommunication systems disclosed herein have filter circuits selected to provide gain control of the communication channels based on speech of the attendant and customer and to discriminate against ambient or environmental noise.

One of the two channels, generally the one from the attendant to the customer, provides control over the gain of the other channel so that when the attendant is talking the customer cannot override or interrupt.

The control circuits include active rectifiers with filters, signal threshold circuits and integrators with charge and discharge times which control the attack and decay of the channel gain change.

Figure 1:
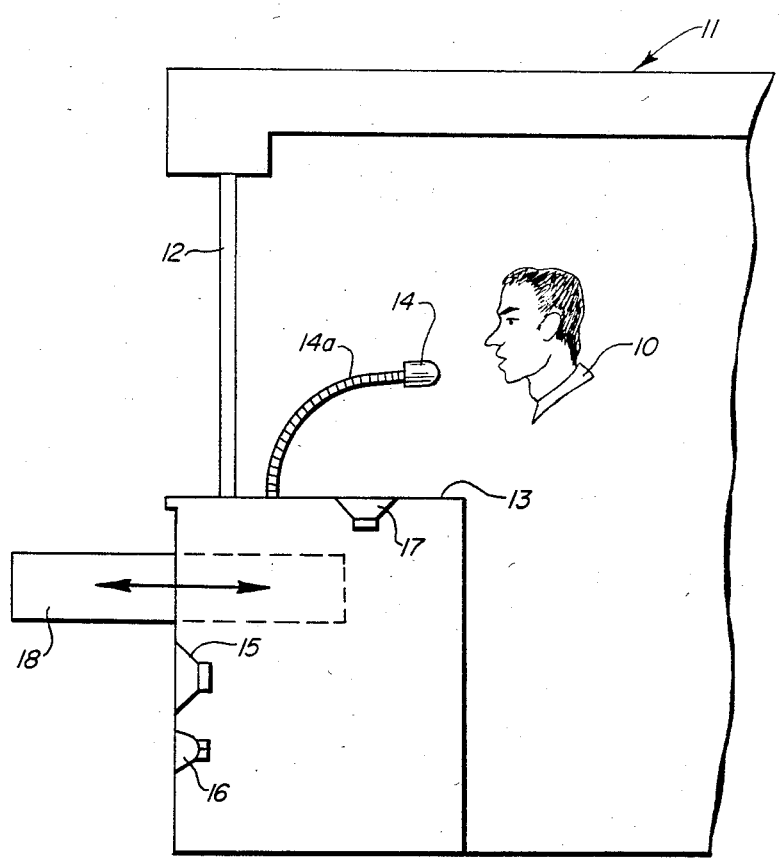
FIG. 1 is a fragmentary diagram of an intercommunication system installation illustrating an environment in which the invention may be used.

FIG. 1 illustrates a typical intercommunication system installation with an attendant 10 in a booth or enclosure 11 which has a window 12 and a counter 13. A microphone 14 for the attendant is at the end of a flexible gooseneck 14a mounted on the counter. One channel of the intercommunication system is connected between the microphone 14 and an outside speaker 15 for communication from the attendant to the patron (not shown). An outside microphone 16 is connected through the second channel of the intercommunication system with the inside speaker 17 mounted in the counter 13 below microphone 14. A sliding drawer 18 below the counter 13 provides for the transfer of money, charge cards or the like between the patron and the attendant without opening the enclosure 11.

Figure 2:
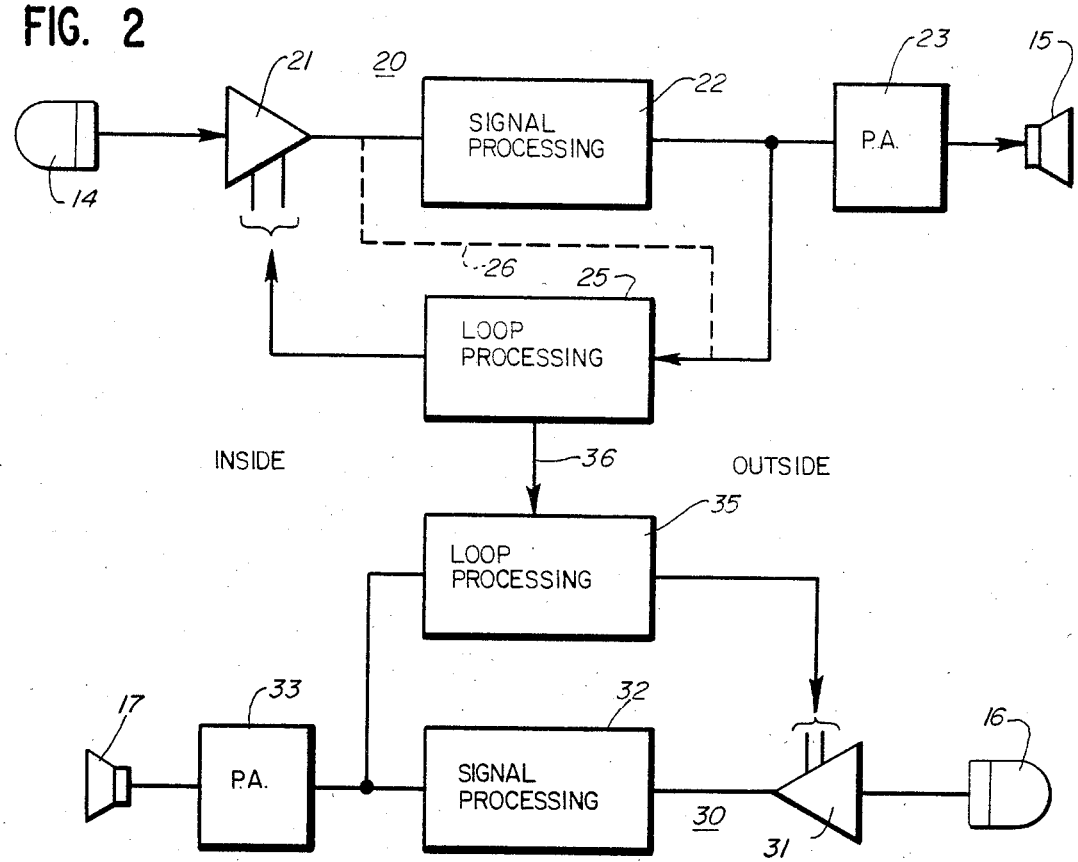
FIG. 2 is a block diagram of one form of the invention.

FIG. 2 shows an intercommunication system which is satisfactory where noise conditions are mild. A first channel 20 has microphone 14 connected with a gain control amplifier 21, shown as having two control ports and which will be described in more detail below. The output of the gain control stage 21 is connected with a signal processing circuit 22, the output of which is connected with a power amplifier 23 and speaker 15. A gain control loop is connected from the output of signal processing circuit 22 through a gain control loop processing circuit 25 with the control ports of amplifier 21. Alternatively, the input for loop processing circuit 25 may be obtained from the output of amplifier 21 as indicated by the dashed line 26; or signals may be obtained from two or more points in channel 20 to achieve a desired gain control characteristic. Amplifier 21 is in a high gain condition in the absence of a signal.

The second channel 30 has microphone 16 connected with a gain control amplifier 31, the output of which is connected with signal processing circuit 32 and to power amplifier 33 and speaker 17. The gain control loop processing circuit 35 is connected from the output of signal processing circuit 32 to the control port of amplifier 31. As noted above, the input for gain control loop processing circuit 35 may be derived from other suitable points in signal channel 30.

In the typical intercommunication system, it is desirable that the attendant utilizing the microphone 14 and channel 20 control the conversation. Accordingly, a control circuit indicated by line 36 provides a control signal from the first channel gain control loop processing circuit 25 to the second channel gain control loop processing circuit 35. This interchannel control may block second channel 30 to prevent communication while the first channel 20 is in use. Alternatively, the gain of second channel 30 may be reduced to a low level while first channel 20 is in use so that the attendant can monitor system operation by listening to the signal picked up by microphone 16 and returned through speaker 17.

Figure 3:
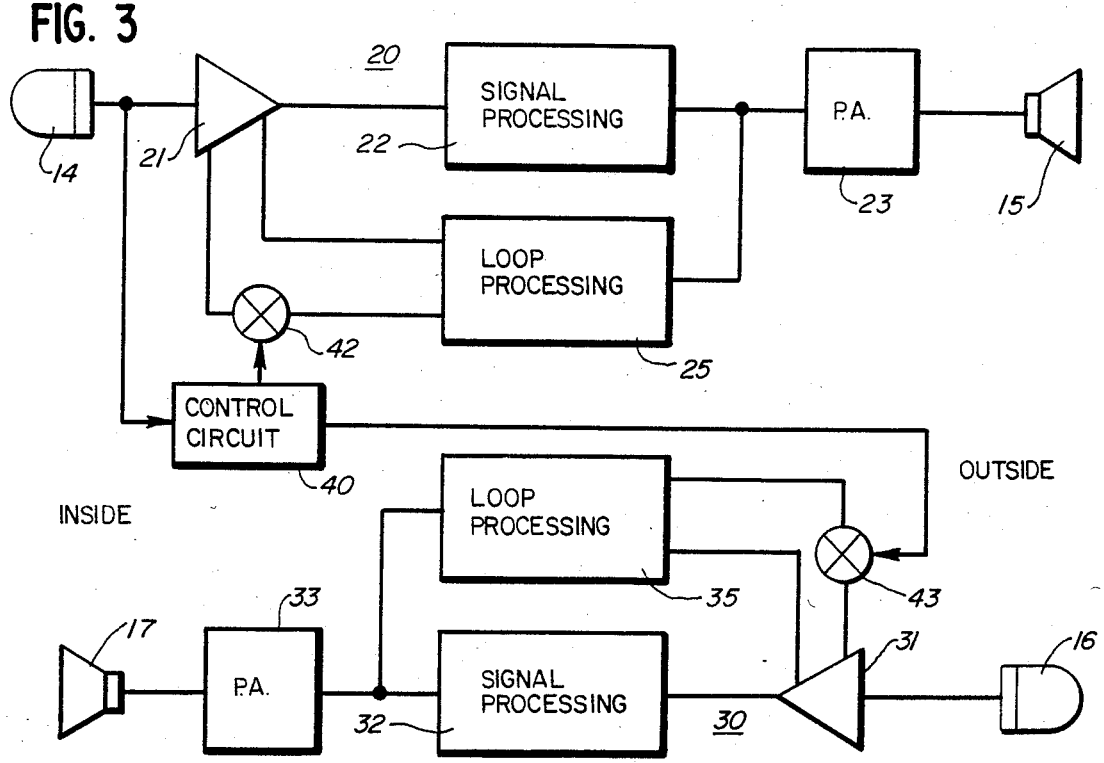
FIG. 3 is a block diagram of a second form of the invention.

In order to achieve satisfactory operation with severe noise conditions, a more sophisticated control of the gain control loop processing circuits is desirable. Such a system is shown in FIG. 3. Elements common with the system of FIG. 2 will be identified by the same reference numerals, although it will be understood that details of the circuitry may differ. In the first channel 20 microphone 14 is connected with amplifier 21 which in the absence of an input signal is biased to a low level of gain. The output of amplifier 21 is connected through signal processing circuit 22 with power amplifier 23 and speaker 15. The gain control loop processing circuit 25 is connected from the output of signal processing circuit 22 with the gain control input ports of amplifier 21.

In the second signal channel 30, microphone 16 is connected with the input of amplifier 31 and through signal processing circuitry 32 with power amplifier 33 and speaker 17. Gain control loop processing circuitry 35 is connected from the output of signal processing circuitry 32 with the control ports of amplifier 31.

A control circuit 40 has an input connected with the microphone 14. When communication is initiated by the attendant, the control circuit responds rapidly to provide a signal which is combined at summing junction 42 with the output of the first channel gain control loop processing circuit 25 to turn amplifier 21 on. This circuit must operate rapidly so that the initial syllable of the operator's communication is not lost. The control circuit on the other hand must discriminate against noise, the operator's breathing, and the like. A signal is also derived from control circuit 40 and connected with the summing junction 43 where it is combined with an output of the second channel gain control loop processing circuit 35 to reduce the gain of or cutoff amplifier 31.

Figure 4:
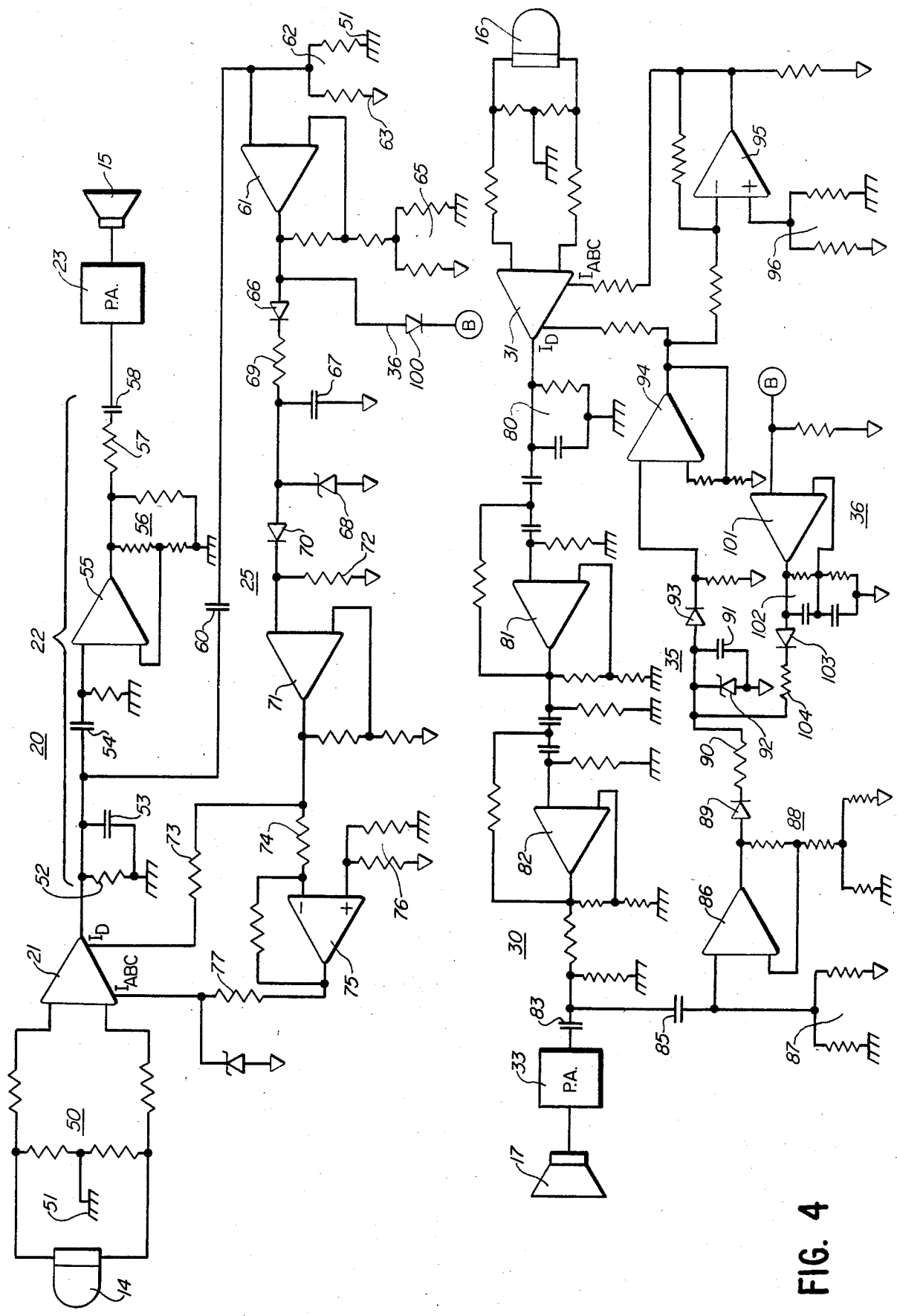
FIG. 4 is a schematic diagram of the system of FIG. 2.
Figure 5:
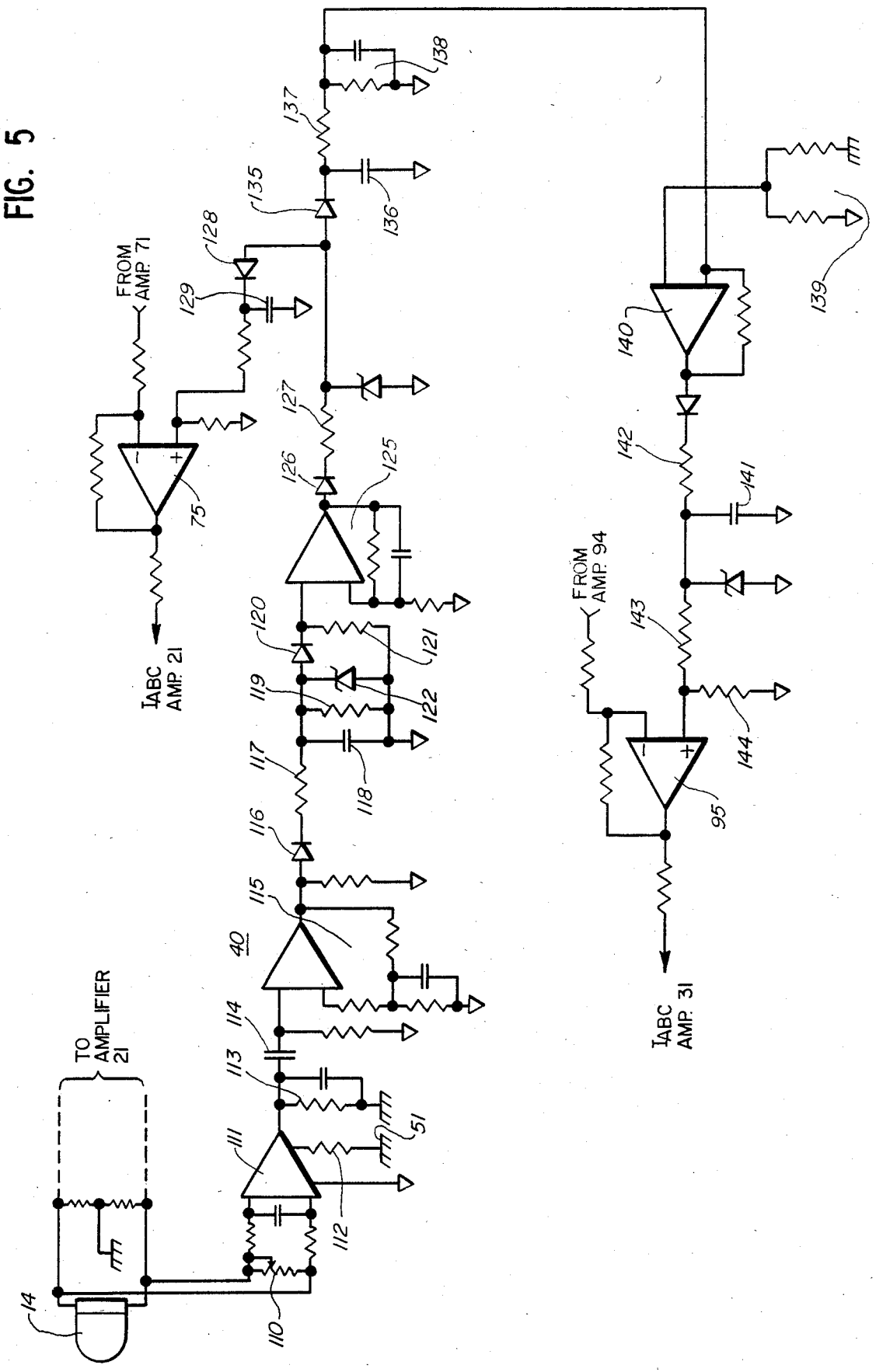
FIG. 5 is a schematic diagram of the control circuit of FIG. 3.

FIGS. 4 and 5 illustrate in schematic form specific circuits for the intercommunication systems of FIGS. 2 and 3. These circuits represent operative embodiments of the invention. Many modifications in specific aspects of the circuits are possible, through choice of the circuit designer and to accommodate particular conditions of noise and other system conditions. In these circuits use is made of bipolar operational amplifiers with a bipolar power supply having a stabilized voltage reference as disclosed in Liberman application Ser. No. 518,816, filed Aug. 1, 1984, entitled Power Supply and Signal Amplifier and Method of Operation. The controlled gain amplifiers for the circuits illustrated are RCA operational transconductance amplifiers (OTA) type CA3280. The other operational amplifiers are RCA type CA3240; Other amplifiers with similar characteristics may be used. In the circuit diagrams the amplifiers are shown with the direct input at the top and the inverting input at the bottom unless the opposite is noted.

In FIG. 4, microphone 14 is connected with a resistive balancing network 50 returned to stabilized voltage reference 51 and to gain controlled amplifier 21. The signal processing circuit 22 includes the load resistor 52 for gain controlled amplifier 21 shunted by a capacitor 53 providing a signal shaping circuit. The amplified signal is connected through coupling capacitor 54 with amplifier 55 having a resistive load 56. The output of amplifier 55 is connected through series resistor 57 and coupling capacitor 58 with power amplifier 23 and speaker 15.

The input for the gain control loop processing circuit 25 is selected at the output of amplifier 21 and connected through coupling capacitor 60 with amplifier 61 which has a threshold circuit 65 provided by a voltage divider connected between the voltage reference 51 and $V-63$. The threshold circuit establishes the signal level at which the gain control loop begins to function. The input of amplifier 61 is referred to a voltage divider 62 which is also connected between the stable voltage reference and $V-$. Amplifier 61 together with diode 66, resistor 69 and shunt capacitor 67 form an active rectifier and integrator circuit for the gain control signal. Zener diode 68 clips any signal spikes which may occur. The signal developed across capacitor 67 is coupled through diode 70 to amplifier 71. The discharge time of capacitor 67, controls decay of the voltage on the capacitor and is determined by the value of shunt resistor 72 at the input of amplifier 71.

The operational transconductance amplifier 21 has two control ports $I_{ABC}$ and $I_D$. Both are used. The output of amplifier 71 is connected through a resistor 73 with port $I_D$ and through resistor 74 with an inverting amplifier 75 having a threshold circuit 76. The output of amplifier 75 is connected through resistor 77 with the $I_{ABC}$ control port. In the absence of a signal in channel 20, the gain of amplifier 21 is high. When the attendant uses microphone 14 the signal through gain loop processing circuit 25 causes the output of amplifier 71 to become more positive. This input to $I_D$ control port of amplifier 21 reduces the input impedance of the amplifier thus reducing the effective gain. When the voltage at the inverting input of amplifier 75 exceeds the threshold bias at the direct input, a signal is applied to the $I_{ABC}$ input port reducing the gain of amplifier 21 in the first channel.

The circuit of the second channel 30 operates in a similar manner but the details are somewhat different as the signal conditions are different. The following description will emphasize the differences rather than repeat the similarities. A signal from microphone 16 is coupled through OTA gain controlled amplifier 31 with load circuit 80 to two active filter stages utilizing the amplifiers 81, 82. Filtering is provided by capacitive and resistive coupling and feedback circuits which discriminate against the low frequency resonance of first channel speaker 15. This minimizes feedback at the end of transmission of a signal through channel 20. The output of amplifier-filter 82 is connected through coupling capacitor 83 with power amplifier 33 and speaker 17.

The gain control loop processing circuit 35 derives its input from the output of amplifier 82 through coupling capacitor 85. The signal is connected with an active rectifier including amplifier 86 having a threshold circuit 88 and an input circuit 87. The output of amplifier 86 is connected with a rectifier diode 89 and through a series resistor 90 with integrator capacitor 91. The time constant of the charging circuit for capacitor 91 provides a desired delay in the attack characteristic of the gain control. Zener diode 92 clips signal peaks. The integrated signal is connected through rectifier 93 with amplifier 94 which provides the $I_D$ input to variable gain amplifier 31. Again, the $I_{ABC}$ input for amplifier 31 is developed from the output of amplifier 94 through inverter 95 having a threshold circuit 96.

The circuit 36 which reduces the gain in channel 30 while channel 20 is being used includes a rectifier diode 100 connected at terminal B with an amplifier 101 which together with its load 102 and diode 103 forms a low pass filter and active integrator circuit with capacitor 91. The charge time of this circuit is determined by series resistor 104 which is selected to provide the desired attack time control of the first channel 20 over communication in second channel 30.

In a high noise environment it is undesirable to have the first channel 20 in a high gain condition in the absence of a voice signal at microphone 14. FIG. 5 illustrates the control circuit 40, FIG. 3, which detects a voice signal, discriminating against noise, to provide turn-on and turn-off signals for amplifier 21. It will be understood that the terms turn-on and turn-off are not absolute but that the circuits may adjust the gain up and down and that the amplifiers are not turned off.

In FIG. 5 a signal from microphone 14 is connected across sensitivity adjustment potentiometer 110 with OTA 111 which has fixed bias provided by a connection of $I_D$ port to V— and $I_{ABC}$ port through resistor 112 to the regulated reference 51. The output of amplifier 111 is developed across shaping circuit 113 and coupled through capacitor 114 with a high pass active rectifier circuit 115. The rectified signal from the first rectifier diode 116 is connected through series resistor 117 to charge integrator capacitor 118. Shunt resistor 119, diode 120 and resistor 121 establish the discharge characteristic of capacitor 118. Zener diode 122 clips spikes. A second active filter and rectifier stage 125 has a low pass characteristic. The signal through rectifier diode 126 and series resistor 127 provides control for both signal channels.

The signal coupled through rectifier diode 128 and integrated by capacitor 129 is connected with the direct input of inverting amplifier 75 providing a turn-on signal to the $I_{ABC}$ port of amplifier 21. This is shown as summing junction 42 in FIG. 3.

The control signal for channel 30 is connected through rectifier diode 135 to integrator capacitor 136. Series resistor 137 and shunt resistor-capacitor network 138 provide discharge timing and shaping for the signal on capacitor 136. A signal across network 138 is connected with the inverting input of amplifier 140. A threshold network 139 is connected with the direct input. The output of amplifier 140 is integrated by capacitor 141 with the charge characteristic being determined by resistor 142 and the discharge characteristic by resistors 143, 144. This signal is applied to the direct input of amplifier 95 (summing junction 43) to control the turn-off of amplifier 31.

The multiple filtering, rectification and time constant circuitry of FIG. 5 emphasizes voice signals and discriminates against noise. The signal derived through rectifier 128 and applied to amplifier 75 has a short response time providing a fast attack to increase the gain of amplifier 21 when the attendant speaks into the microphone. The circuit controlling amplifier 31 has a longer time constant and slower attack so that the gain is not increased as rapidly in channel 30 as it is increased in channel 20. The time constants of the filters 115 and 125 are selected for the noise conditions typical of the environment in which the system is to be used. These may be different for a service station, a bank teller and a fast food operation, for example.

I claim:

1. In an intercommunication system having first and second channels for speech communication between two parties at two locations, with the microphone of the first channel and speaker of the second channel at one location for use by a first party and the speaker of the first channel and microphone of the second channel at the other location for use by the second party, each channel having an amplifier connected between the microphone and speaker, the improvement comprising:

a first gain control loop connected with the first channel to control amplifier gain of the first channel in accordance with the signal level in the first channel;

a second gain control loop connected with the second channel to contol amplifier gain of the second channel in accordance with the signal level in the second channel; and means interconnecting the first channel with the second gain control loop to control gain of the second channel in accordance with the signal level in the first channel, the gain control loop of the first channel being independent of the signal level in the second channel whereby a signal in the first channel from the first party to the second party dominates the second channel, affording said first party control of communication from the second party to the first party.

2. The intercommunication system of claim 1 wherein said interconnecting means is an interconnection between the first gain control loop and the second gain control loop.

3. The intercommunication system of claim 1 wherein said interconnecting means is a control circuit connected between the first signal channel and the second gain control loop.

4. The intercommunication system of claim 3 in which said control circuit is connected with and affects the operation of the first gain control loop.

5. The intercommunication system of claim 3 in which each channel includes an operational transconductance amplifier with $I_{ABC}$ and $I_D$ control ports, and the gain control loop for that channel provides inputs to both control ports and the control circuit provides an on-off control to the $I_{ABC}$ port.

6. The intercommunication system of claim 1 for operation in a location subject to moderate noise, the amplifier gain of the first channel being at a high level in the absence of a signal in the first channel, the amplifier gain being reduced by the gain control loop in accordance with the signal level in the channel.

7. The intercommunication system of claim 6 in which the first channel gain control loop has a threshold circuit establishing a minimum signal level before amplifier gain is reduced.

8. The intercommunication system of claim 1 for operation in a location subject to severe noise, the amplifier gain of the first channel being at a low level in the absence of a signal in the first channel, the system including a control circuit connected between the first channel microphone and the first channel gain control loop to turn the first channel amplifier on in the presence of a voice signal at the micrpohone.

9. The intercommunication system of claim 8 in which said control circuit has a fast attack characteristic to turn on the first channel amplifier rapidly.

10. The intercommunication system of claim 8 in which said control circuit includes a filter which discriminates against noise and in favor of voice signals.

11. The intercommunication system of claim 8 in which said control circuit is connected with the gain control loop of the second channel to turn off the second channel amplifier with a signal from the first channel microphone.

12. The intercommunication system of claim 1 in which the gain control loop for the first channel has its input connected with a signal shaper that is connected with the output of the first channel amplifier, to enhance the voice signal and reduce noise in the gain control loop.

13. The intercommunication system of claim 1 in which the gain control loop for the second channel includes filter circuits which discriminate against the resonance characteristic of the first channel speaker.

14. The intercommunication system of claim 1 in which said gain control loops include integrator circuits each having a shunt capacitor with capacitor charge and discharge resistors establishing charge and discharge time constants to enhance voice signals and to discriminate against noise.

15. The intercommunication system of claim 1 in which each of said channels includes an operational transconductance amplifier with $I_{ABC}$ and $I_D$ control ports and in which each of said gain control loops include a rectifier with an output representing the signal level in said channel, a first circuit connecting said rectifier output with one of said amplifier control ports to reduce gain as the signal level in the channel increases, and a second circuit with a threshold bias, connecting said rectifier output to the other of said amplifier control ports to provide a greater gain reduction when the channel signal level is such that the rectifier output exceeds said threshold level.

16. The intercommunication system of claim 15 in which the gain control signal of each gain control loop is connected through the first circuit directly with the $I_D$ control port and through the second circuit with the $I_{ABC}$ control port of the amplifier in the related channel.

* * * * *